US012634840B2

(12) United States Patent (10) Patent No.: US 12,634,840 B2
Dong (45) Date of Patent: May 19, 2026

(54) COMMUNICATION METHODS AND COMMUNICATION APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 286 days.

(21) Appl. No.: 18/281,077

(22) PCT Filed: Mar. 11, 2021

(86) PCT No.: PCT/CN2021/080277
§ 371 (c)(1),
(2) Date: Sep. 8, 2023

(87) PCT Pub. No.: WO2022/188106
PCT Pub. Date: Sep. 15, 2022

(65) Prior Publication Data
US 2024/0147386 A1 May 2, 2024

(51) Int. Cl.
_H04W 52/36_ (2009.01)

(52) U.S. Cl.
CPC .................................. _H04W 52/367_ (2013.01)

(58) Field of Classification Search
CPC ............. H04W 52/367; H04W 52/146; H04W 52/54; H04W 52/346; H04W 52/365; H04W 52/38; H04W 84/12; H04W 72/0473; H04W 52/545
See application file for complete search history.

(56) References Cited

U.S. PATENT DOCUMENTS

| | | | |
|---|---|---|---|
| 8,538,358 B1 | 9/2013 | Steinbrecher | |
| 10,785,706 B2 | 9/2020 | Verma et al. | |
| 10,856,311 B2 * | 12/2020 | Chen ..................... | H04L 5/0041 |
| 11,751,191 B2 * | 9/2023 | Chu .................. | H04W 72/0453 370/329 |
| 2002/0144272 A1 | 10/2002 | McLain et al. | |
| 2014/0211703 A1 | 7/2014 | Seok | |
| 2016/0050634 A1 | 2/2016 | Seok | |
| 2019/0116545 A1 | 4/2019 | Verma et al. | |
| 2019/0253984 A1 | 8/2019 | Cariou et al. | |

(Continued)

FOREIGN PATENT DOCUMENTS

| | | |
|---|---|---|
| CN | 1599989 A | 3/2005 |
| CN | 110351883 A | 10/2019 |

(Continued)

OTHER PUBLICATIONS

ISA State Intellectual Property Office of the People's Republic of China, International Search Report Issued in Application No. PCT/CN2021/080277, Nov. 29, 2021, WIPO, 4 pages.

(Continued)

_Primary Examiner_ — Lester G Kincaid
(74) _Attorney, Agent, or Firm_ — Volpe Koenig

(57) ABSTRACT

A communication method and apparatus include: determining a first message frame, where the first message frame includes a transmit power envelope element, and the transmit power envelope element includes information indicative of maximum transmit power for a 320 MHz/160+160 MHz bandwidth; and transmitting the first message frame.

16 Claims, 4 Drawing Sheets

Determine a first message frame 210

Transmit the first message frame 220

(56)        References Cited

U.S. PATENT DOCUMENTS

| | | | |
|---|---|---|---|
| 2019/0281614 A1 | 9/2019 | Chen et al. | |
| 2020/0128492 A1 | 4/2020 | Cariou et al. | |
| 2023/0247568 A1* | 8/2023 | Dong .................... | H04W 52/58 |
| | | | 370/311 |
| 2024/0007966 A1* | 1/2024 | Dong .................. | H04W 52/262 |

FOREIGN PATENT DOCUMENTS

| | | | |
|---|---|---|---|
| CN | 111213428 A | 5/2020 | |
| CN | 111294106 A | 6/2020 | |
| CN | 111586738 A | 8/2020 | |
| CN | 112188432 A | 1/2021 | |
| CN | 112272929 A | 1/2021 | |
| WO | 2019191963 A1 | 10/2019 | |
| WO | 2021029084 A1 | 2/2021 | |

OTHER PUBLICATIONS

State Intellectual Property Office of the People's Republic of China, Office Action and Search Report Issued in Application No. 2021800006805, Jul. 26, 2024, 21 pages.
ISA State Intellectual Property Office of the People's Republic of China, Written Opinion of the International Searching Authority Issued in Application No. PCT/CN2021/080277, Nov. 29, 2021, WIPO, 6 pages.

\* cited by examiner

AP non-AP 1 non-AP 2 non-AP 3

Determine a first message frame — 210

Transmit the first message frame — 220

Maximum Transmit Power Interpretation subfield encoding

| Value | Interpretation of the Maximum Transmit Power field (Manner of Identifying the Maximum Transmit Power) |
|---|---|
| 0 | Local EIRP |
| 1 | Local EIRP PSD |
| 2 | Regulatory client EIRP |
| 3 | Regulatory client EIRP PSD |
| 4-7 | Reserved |

FIG. 3

Meaning of Maximum Transmit Power Count subfield if the Maximum Transmit Power Interpretation subfield is 0 or 2

| Value of Maximum Transmit Power Count subfield | Maximum Transmit Power field(s) present |
|---|---|
| 0 | Maximum Transmit Power for 20 MHz. |
| 1 | Maximum Transmit Power for 20 MHz, and Maximum Transmit Power for 40 MHz. |
| 2 | Maximum Transmit Power for 20 MHz, Maximum Transmit Power for 40 MHz, and Maximum Transmit Power for 80 MHz. |
| 3 | Maximum Transmit Power for 20 MHz, Maximum Transmit Power for 40 MHz, Maximum Transmit Power for 80 MHz, and Maximum Transmit Power for 160/80+80 MHz. |
| 4 | Maximum Transmit Power for 20 MHz, Maximum Transmit Power for 40 MHz, Maximum Transmit Power for 80 MHz, Maximum Transmit Power for 160/80+80 MHz, Maximum Transmit Power for 320/160+160 MHz. |
| 5-7 | Reserved |

FIG. 4

Meaning of Maximum Transmit Power Count subfield if the Maximum Transmit Power
Interpretation subfield is 1 or 3
| Value of Maximum Transmit Power Count subfield | N |
|---|---|
| 0 | 0 |
| 1 | 1 |
| 2 | 2 |
| 3 | 4 |
| 4 | 8 |
| 5 | 16 |
| 6-7 | Reserved |
FIG. 5
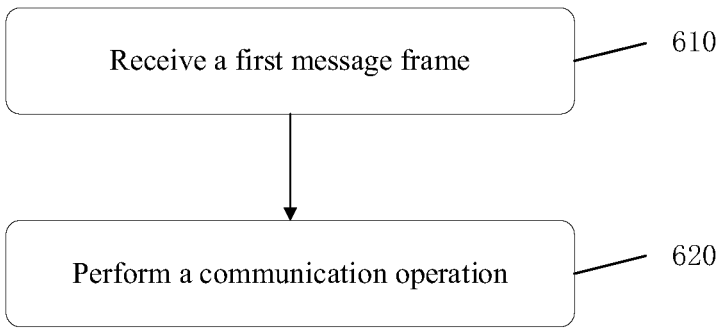
Receive a first message frame                    610
Perform a communication operation                620
FIG. 6
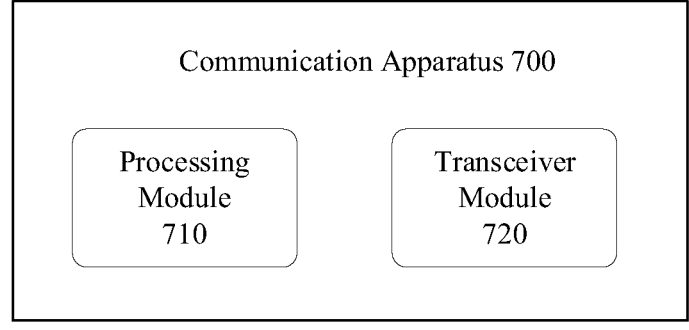
Communication Apparatus 700
Processing Module 710
Transceiver Module 720
FIG. 7

COMMUNICATION METHODS AND COMMUNICATION APPARATUS

CROSS REFERENCE

The present application is a U.S. National Stage of International Application No. PCT/CN2021/080277, filed on Mar. 11, 2021, the contents of which are incorporated by reference herein in their entireties for all purposes.

TECHNICAL FIELD

The present disclosure relates to the field of communication, and more specifically, to communication methods and communication apparatuses in wireless communication.

BACKGROUND

A studied scope of the current Wi-Fi technology includes a transmission in a 320 MHz bandwidth, multi-band aggregation, etc. It is expected to be able to improve at least four times a rate and throughput relative to the existing standard, and its main application scenarios are a video transmission, AR (Augmented Reality), VR (Virtual Reality), etc.

The multi-band aggregation means that devices can communicate across 2.4 GHz, 5.8 GHz, and 6-7 GHz bands at the same time, and a new MAC (Media Access Control) mechanism needs to be defined to manage the simultaneous communication between devices in multiple frequency bands. In addition, it is also expected that multi-band aggregation can support a low latency transmission.

The maximum bandwidth to be supported in the current multi-band aggregation and system technology is a 320 MHz/160+160 MHz. In addition, it may support a 240 MHz (160+80 MHz) bandwidth and other bandwidths.

In wireless communication, TCP (Transmission Power Control) is usually used to control the transmit power of a device in order to realize the purposes of reducing the interference between devices and power saving of the device. However, the prior art does not address transmit power control at the maximum bandwidth(s) currently being studied (e.g., 320 MHz/160+160 MHz), and therefore enhancements are needed.

SUMMARY

Aspects of the present disclosure address at least the above problems and drawbacks. Various embodiments of the present disclosure provide the following technical solutions.

An example embodiment according to the present disclosure provides a communication method. The communication method may include: determining a first message frame, where the first message frame includes a transmit power envelope element, and the transmit power envelope element includes information indicative of maximum transmit power for a 320 MHz/160+160 MHz bandwidth; and transmitting the first message frame.

An example embodiment according to the present disclosure provides a communication method. The communication method may include: receiving a first message frame, where the first message frame includes a transmit power envelope element, and the transmit power envelope element includes information indicative of maximum transmit power for a 320 MHz/160+160 MHz bandwidth; and performing a communication operation based on the first message frame.

A communication apparatus is provided according to example embodiments of the present disclosure. The communication apparatus includes: a processing module, configured to determine a first message frame, where the first message frame includes a transmit power envelope element, and the transmit power envelope element includes information indicative of maximum transmit power for a 320 MHz/160+160 MHz bandwidth; and a transceiver module, configured to transmit the first message frame.

A communication apparatus is provided according to example embodiments of the present disclosure. The communication apparatus includes: a transceiver module, configured to receive a first message frame, where the first message frame includes a transmit power envelope element, and the transmit power envelope element includes information indicative of maximum transmit power for a 320 MHz/160+160 MHz bandwidth; and a processing module, configured to perform a communication operation based on the first message frame.

An electrical device is provided according to example embodiments of the present disclosure. The electrical device includes a memory, a processor and a computer program stored on the memory and executable on the processor. The processor implements methods as described above when executing the computer program.

A computer readable storage medium is provided according to example embodiments of the present disclosure. The computer-readable storage medium has a computer program stored thereon. The computer program implements methods as described above when executed by a processor.

Example embodiments of the present disclosure provide technical solutions that improve spectrum utilization.

BRIEF DESCRIPTION OF DRAWINGS

The above-mentioned and/or other aspects of the present disclosure will become more apparent by describing in detail the exemplary embodiments with reference to accompanying drawings, in which:

FIG. 3 is a schematic diagram illustrating a first identification according to embodiments.

FIG. 4 is a schematic diagram illustrating the meaning of a third identification according to embodiments.

FIG. 5 is a schematic diagram illustrating a meaning of a third identification according to embodiments.

FIG. 6 is a flowchart illustrating another communication method according to example embodiments.

FIG. 7 is a block diagram illustrating a communication device according to embodiments.

DETAILED DESCRIPTION

The following description with reference to the accompanying drawings is provided to assist in a comprehensive understanding of various embodiments of the disclosure as defined by the appended claims and their equivalents. Various embodiments of the present disclosure include various specific details, but these are to be considered merely exemplary. In addition, descriptions of well-known technologies, functions, and configurations may be omitted for clarity and conciseness.

The terms and words used in the present disclosure are not limited to the written meaning, but are merely used by the inventor to enable a clear and consistent understanding of the present disclosure. Therefore, for those skilled in the art, the description of the various embodiments of the present disclosure is provided only for the purpose of illustration, not for the purpose of limitation.

It is to be understood that the singular forms "a", "an", "the" and "said" may include plural forms as well, unless the context clearly indicates otherwise. It will be further understood that the terms "comprises" and/or "includes" when used in this disclosure, specify the presence of stated features, integers, steps, operations, elements, and/or components, but do not preclude the presence or addition of one or more other features, integers, steps, operations, elements, components, and/or groups thereof.

It will be understood that, although the terms "first", "second", etc., may be used herein to describe various elements, these elements should not be limited by these terms. These terms are only used to distinguish one element from another element. Thus, a first element discussed below could be termed a second element without departing from the teachings of example embodiments.

It will be understood that when a component is referred to as being "connected" or "coupled" to other component, the component can be directly connected or coupled to the other component, or an intervening component may also be present. Furthermore, "connected" or "coupled" as used herein, may include the wireless connection or the wireless coupling. As used herein, the term "and/or" or the expression "at least one" includes any and all combinations of one or more of the associated listed items.

Unless otherwise defined, all terms (including technical and scientific terms) used herein have the same meaning as commonly understood by one of ordinary skill in the art to which this disclosure belongs.

Figure 1:
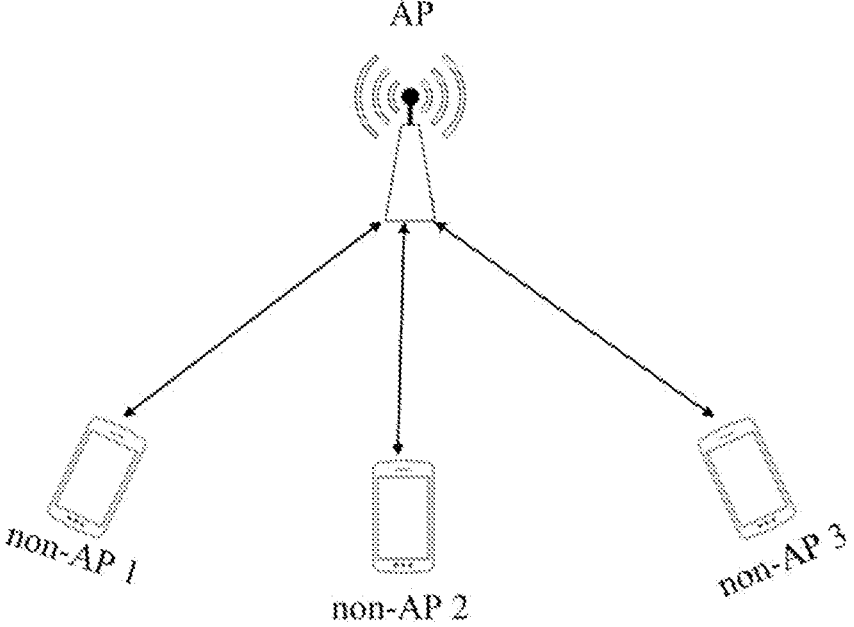
FIG. 1 is an exemplary diagram illustrating a wireless communication scenario.

FIG. 1 is an exemplary schematic diagram illustrating a wireless communication scenario.

In a wireless local area network, a basic service set (BSS) may include at least one station (STA) and an access point (AP). The STA may also be represented as a non-AP. A BSS can be connected to a distribution system (DS) through its AP, and then accessed to another BSS, which constitute an extended service set (ESS).

The AP may be a wireless network switch used in a wireless network, and the AP is the core of the wireless network. The AP can be used as a wireless base station, which mainly used as a bridge to connect a wireless network to a wired network. With such AP(s), wired and wireless networks can be integrated.

As examples, the AP may include software applications and/or circuitry to enable other types of nodes in a wireless network to communicate with the outside and inside of the wireless network via the AP. For example, the AP may be a terminal or a network device equipped with a Wi-Fi (Wireless Fidelity) chip.

As examples, stations (non-APs) may include, but are not limited to: cellular phones, smart phones, wearable devices, computers, personal digital assistants (PDAs), personal communication system (PCS) devices, personal information managers (PIMs), personal navigation devices (PNDs), global positioning systems, multimedia devices, Internet of Things (IoT) devices, and the like.

Although an AP communicating with three non-APs (non-AP 1, non-AP 2, non-AP 3) is shown in FIG. 1, this is only exemplary, and embodiments of the present disclosure are not limited to this. For example, the APs and the non-APs may be of any number and/or any type.

Furthermore, the stations (non-APs) and access points (APs) may be multi-link devices (MLDs), e.g., supporting the function of being able to transmit and/or receive simultaneously under multiple connections/links at the same moment. Thus, the communication methods and communication apparatuses provided according to embodiments of the present disclosure may also be applied to more complex multi-link communication environments.

Figure 2:
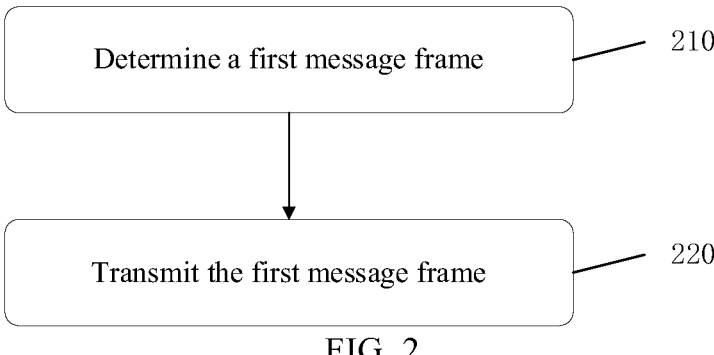
FIG. 2 is a flowchart illustrating a communication method according to embodiments.

FIG. 2 is a flowchart illustrating a communication method according to example embodiments of the present disclosure. The communication method described in FIG. 2 may be operations performed on the AP side, including steps 210 and 220.

Referring to FIG. 2, at step 210, a first message frame is determined. At step 220, the first message frame is transmitted. The first message frame will be described in detail below.

According to embodiments, the first message frame may be a beacon frame. However, this is only exemplary, and the present disclosure is not limited thereto. The first message frame may also be a management frame, a data frame, or a control frame capable of carrying a variety of information and/or data, for which embodiments of the present disclosure is not specifically limited. In embodiments of the present disclosure, there may be various ways of determining the first message frame. For example, the AP may generate the first message frame based on at least one of the following: a network condition, a load condition, hardware capability of a transmitting/receiving device, a service type, and a relevant protocol stipulation, for which embodiments of the present disclosure are not specifically limited. In embodiments of the present disclosure, the AP may also obtain the first message frame from an external device, for which embodiments of the present disclosure are not specifically limited.

According to embodiments of the present disclosure, the first message frame may include a transmit power envelope element. The transmit power envelope element may be used to define maximum transmit power for each bandwidth. According to embodiments of the present disclosure, the transmit power envelope element may include information indicative of maximum transmit power for a 320 MHz/160+ 160 MHz bandwidth. Additionally, the transmit power envelope element may include information indicative of maximum transmit power for at least one of the bandwidths: 20 MHz, 40 MHz, 80 MHz, or 160 MHz/80+80 MHz. However, this is only exemplary and the present disclosure is not limited thereto, and the transmit power envelope element may also include information indicative of maximum transmit power for other bandwidth(s) (e.g., 240 MHz/160+80 MHz, or other bandwidth(s) that will be used for communication).

According to embodiments of the present disclosure, the transmit power envelope element includes a first identification for indicating a manner of identifying the maximum transmit power.

According to embodiments of the present disclosure, the transmit power envelope element further includes at least one second identification for indicating maximum transmit power with respect to one or more bandwidths.

According to embodiments of the present disclosure, the transmit power envelope element further includes a third identification, where the third identification is related to a number of the at least one second identification.

The transmit power envelope element and the identifications will be described in detail below with reference to Table 1 to Table 5. It will be appreciated that each of the elements in Tables 1 to 5 of the present disclosure exists independently, and that the elements are exemplarily listed in the same table, but that does not mean that all of the elements in a table must be present at the same time according to what is shown in the table. The value of each of these elements may be independent of any other element value in Tables 1 to 5. It is therefore understood by those skilled in the art that the value of each element in the tables of the present disclosure is an independent embodiment.

As an exemplary description, the transmit power envelope element may have the format shown in Table 1 below.

TABLE 1

| Transmit Power Envelope element | | | |
| --- | --- | --- | --- |
| Element ID | Length | Transmit Power Information | Maximum Transmit Power |

In Table 1, the element identification (Element ID) field and the length field may be an identity identifier and a length with respect to a transmit power envelope element. The transmit power information field may include the first identification and the third identification described in the above embodiments. The maximum transmit power field may include or correspond to the at least one second identification described in the above embodiments. In an embodiment, the element identification field, the length field, and the transmit power information field in the transmit power envelope element may all have a specific size, e.g., 1 octet. A maximum transmit power field may be of variable size, and the number of maximum transmit power fields may also be variable.

As an exemplary description, the transmit power information field in Table 1 may have the format shown in Table 2 below.

TABLE 2

| Transmit Power Information field | | |
| --- | --- | --- |
| Maximum Transmit Power Count | Maximum Transmit Power Interpretation | Maximum Transmit Power Category |

In Table 2, a maximum transmit power count subfield may correspond to the third identification described in the above embodiments, and a maximum transmit power interpretation subfield may correspond to the first identification described in the above embodiments. As examples, both the maximum transmit power count subfield and the maximum transmit power interpretation subfield may have a specific size (e.g., but not limited to, 3 bits). Additionally, a maximum transmit power category subfield in Table 2 may indicate a category to which the maximum transmit power is applied, which may be set as a default category or may be country dependent, for which this disclosure is not specifically described. As an example, the maximum transmit power category subfield may have a specific size (e.g., but not limited to, 2 bits).

In embodiments of the present disclosure, the maximum transmit power interpretation subfield may correspond to the first identification for indicating an identification manner for the maximum transmit power. When the maximum transmit power interpretation subfield (the first identification) is set to a different value, it may be indicative of identifying the maximum transmit power in a different manner. For example, FIG. 3 illustrates the meaning of maximum transmit power interpretation subfield (the first identification) encoding.

Referring to FIG. 3, this maximum transmit power interpretation subfield (the first identification) may indicate that maximum transmit power for each bandwidth is to be identified in terms of effective isotropic radiated power (EIRP), which is indicated by values 0 and 2 in FIG. 3; or that the maximum transmit power for each bandwidth is to be identified in terms of EIRP power spectral density (PSD), which is shown as values 1 and 3 in FIG. 3. The manners are different. The EIRP manner represents a maximum transmit power value for each bandwidth. Whereas the PSD manner represents maximum transmit power corresponding to one or more basic channel bandwidths (e.g., 20 MHz) within a BSS bandwidth. It will be appreciated that the example of the maximum transmit power interpretation subfield (the first identification) shown in FIG. 3 is merely descriptive and not a limitation of the present disclosure.

According to embodiments of the present disclosure, the format and number of at least one second identification may be defined by the first and third identifications.

In an embodiment, in the case where the first identification (e.g., the maximum transmit power interpretation subfield in Table 2) is set to identify the maximum transmit power in a first manner (e.g., the EIRP manner corresponding to values 0 and 2 in FIG. 3), at least one second identification (e.g., the maximum transmit power field(s) in Table 1) may be used to indicate the maximum emission power for each bandwidth, respectively. In this case, the third identification (e.g., the maximum transmit power count subfield in Table 2) may be configured in correspondence with the at least one second identification (e.g., the maximum transmit power field in Table 1).

In conjunction with FIG. 3, FIG. 4 illustrates the meaning of values of the third identification (e.g., the maximum transmit power count subfield in Table 2) in the case where the first identification (e.g., the maximum transmit power interpretation subfield in Table 2) is configured to the first manner, EIRP (i.e., values 0 and 2 in FIG. 3).

For example, for the currently studied bandwidth of 320 MHz/160+160 MHz, the third identification (e.g., the maximum transmit power count subfield in Table 2) may be set to a first value, in which the at least one second identification (e.g., the maximum transmit power field in Table 1) may be indicative of the maximum transmit power for each of 20 MHz, 40 MHz, 80 MHz, 160 MHz/80+80 MHz, 320 MHz/160+160 MHz bandwidths, respectively. For example, referring to FIGS. 3 and 4, when the value of the first identification (the maximum transmit power interpretation subfield) is set to 0 or 2 to identify the use of EIRP, for supporting a maximum bandwidth of 320 MHz, the value of the third identification (the maximum transmit power count subfield) can be set to "4" (e.g., the first value), identifying that the bandwidths corresponding to the supported maximum transmit power include 20 MHz, 40 MHz, 80 MHz, 160/80+80 MHz, and 320/160+160 MHz. Furthermore, the format of the at least one second identification (the maximum transmit power field) can be formatted as shown in Table 3.

That is, when the first identification (the maximum transmit power interpretation subfield in Table 2) is set to correspond to the EIRP manner (e.g., values 0 and 2 in FIG. 3) and the third identification (the maximum transmit power count subfield in Table 2) is set to the first value (e.g., "4" in FIG. 4), the transmit power envelope element of the first message frame may include a plurality of second identifications (the maximum transmit power fields in Table 1). For example, the second identifications (the maximum transmit power fields in Table 1) may be as shown in Table 3 below. In Table 3, each second identification may represent maximum transmit power for a corresponding bandwidth.

TABLE 3

| Power fields corresponding to the First Manner (EIRP) | | | | |
|---|---|---|---|---|
| Maximum Transmit transmit power for 20 MHz | Maximum transmit power for 40 MHz | Maximum transmit power for 80 MHz | Maximum transmit power for 160/80 + 80 MHz | Maximum transmit power for 320/160 + 160 MHz |

Referring to FIG. 4, for other bandwidths, in case the first identification (the maximum transmit power interpretation subfield in Table 2) being set to the corresponding EIRP manner (e.g., the values 0 and 2 in FIG. 3) which represents the maximum transmit power being in terms of the effective isotropic radiated power, if the third identification (the maximum transmit power count subfield in Table 2) is set to "0", the transmit power envelope element of the first message frame can include one second identification for defining the maximum transmit power for a 20 MHz bandwidth. If the third identification (the maximum transmit power count subfield in Table 2) is set to "1", the transmit power envelope element of the first message frame can include two second identifications for defining the maximum transmit power for 20 MHz and 40 MHz bandwidths, respectively. If the third identification (the maximum transmit power count subfield in Table 2) is set to "2", the transmit power envelope element of the first message frame can include three second identifications for defining the maximum transmit power for 20 MHz, 40 MHz and 80 MHz bandwidths, respectively. If the third identification (the maximum transmit power count subfield in Table 2) is set to "3", the transmit power envelope element of the first message frame can include four second identifications for defining the maximum transmit power for 20 MHz, 40 MHz, 80 MHz and 160/80+80 MHz bandwidths, respectively.

It will be understood that the values and bandwidths shown in FIG. 4 and Table 3 are only descriptive examples and not limitations of the present disclosure, and the third identification (the maximum transmit power count subfield in Table 2) may also be set to other values to identify the maximum transmit power for other bandwidths (e.g., a bandwidth of 240 MHz/160+80 MHz or other bandwidths that is to be used for the communication) according to embodiments of the present disclosure.

In another embodiment, in the case where the first identification (e.g., the maximum transmit power interpretation subfield in Table 2) is configured to identify the maximum transmit power in a second manner (e.g., the EIRP PSD manner, corresponding to values 1 and 3 in FIG. 3), the at least one second identification (e.g., the maximum transmit power field(s) in Table 1) may be used to indicate maximum transmit power (e.g., power spectral density) corresponding to one or more basic channel bandwidths within each bandwidth. According to embodiments of the present disclosure, the basic channel bandwidth may be 20 MHz, but is not limited thereto. In this case, the third identification (e.g., the maximum transmit power count subfield in Table 2) may be set in correspondence with the second identification(s) (e.g., the maximum transmit power field(s) in Table 1), and at least one second identification (e.g., the maximum transmit power field in Table 1) may have a format shown in Table 4 below.

TABLE 4

| Maximum Transmit Power fields corresponding to the Second Manner (EIRP PSD) | |
|---|---|
| Maximum transmit power PSD 1 | . . . Maximum transmit power for PSD N |

In conjunction with FIG. 3 and Table 4, FIG. 5 illustrates the meaning of values of the third identification (e.g., the maximum transmit power count subfield in Table 2) in the case where the first identification (e.g., the maximum transmit power interpretation subfield in Table 2) is configured to the second manner, EIRP PSD (i.e., values 1 and 3 in FIG. 3).

For example, for the bandwidth 320 MHz/160+160 MHz currently studied, in the case where the third identification (e.g., the maximum transmit power count subfield in Table 2) may be set to a second value to indicate the existence of N basic channel bandwidths within the 320 MHz/160+160 MHz bandwidth, the number of the at least one second identification is N, and the N second identifications indicate maximum transmit power for the M basic channel bandwidths within the bandwidth of 320 MHz/160+160 MHz, respectively. N is determined based on the 320 MHz/160+160 MHz bandwidth and the basic channel bandwidth (e.g., 20 MHz). For example, referring to FIGS. 3 and 5, when setting the value of the first identification (the maximum transmit power interpretation subfield) to 1 or 3, identifying the use of the EIRP PSD manner, for supporting a maximum 320 MHz bandwidth, a value of the third identification (the maximum transmit power count subfield) can be set to "5" (e.g., the second value), and a value of N can be set to 16, so as to identify sixteen 20 MHz PSD formats for the 320 MHz/160+160 MHz bandwidth.

That is, when the first identification (the maximum transmit power interpretation subfield in Table 2) is set to correspond to the EIRP PSD manner (e.g., values 1 and 3 in FIG. 3) and the third identification (the maximum transmit power count subfield in Table 2) is set to the second value (e.g., "5" in FIG. 5), the transmit power envelope element of the first message frame may include multiple second identifications (the maximum transmit power fields in Table 1). For example, a format of the second identifications (the maximum transmit power fields) may be as shown in Table 5 below. In Table 5, each second identification may identify maximum transmit power (i.e., the PSD) for a basic channel bandwidth in the corresponding bandwidth.

TABLE 5

| Second Identifications (Maximum Transmit Power) for 320 MHz/160 + 160 MHz | | | |
|---|---|---|---|
| Maximum transmit power PSD 1 | Maximum transmit power PSD 2 | Maximum transmit power PSD 3 | . . . Maximum transmit power PSD 16 |

Referring to Table 5, when the supported bandwidth is 320 MHz, maximum transmit power PSD 1 to maximum transmit power PSD 16 can indicate the PSD corresponding to 20 MHz channels from lowest to highest frequency, respectively, within the 320 MHz bandwidth. When the supported bandwidth is 160+160 MHz, maximum transmit power PSD 1 to maximum transmit power PSD 8 can indicate the PSD corresponding to 20 MHz channels from lowest to highest frequency, respectively, within the 160 MHz bandwidth of a low frequency band; and maximum transmit power PSD 9 to maximum transmit power PSD 16 can indicate the PSD corresponding to 20 MHz channels from lowest to highest frequency, respectively, within the 160 MHz bandwidth of a high frequency band. It is appreciated that the examples described herein with reference to Table 5 are illustrative only, and are not a limitation on the present disclosure, and that the number of pieces of PSD corresponding to the second identifications may vary depending on the basic channel bandwidth of other sizes.

Referring to FIG. 5, when the first identification (the maximum transmit power interpretation subfield in Table 2) is set to the corresponding EIRP PSD (e.g., the values 1 and 3 in FIG. 3) which represents the maximum transmit power in terms of the power spectral density. If the third identification (the maximum transmit power count subfield in Table 2) is set to "0", N is 0, and the transmit power envelope element of the first message frame may include one second identification (one maximum transmit power PSD subfield), indicating the maximum transmit power PSD of a PPDU of any bandwidth within the BSS bandwidth. If the third identification (the maximum transmit power count subfield in Table 2) is set to "1", N is 1, and the transmit power envelope element of the first message frame may include one second identification, defining one 20 MHz PSD format for the 20 MHz bandwidth. If the third identification (the maximum transmit power count subfield in Table 2) is set to "2", N is 2, and the transmit power envelope element of the first message frame may include two second identifications, defining two basic channel bandwidth (20 MHz) PSD formats for the 40 MHz bandwidth, respectively. If the third identification (the maximum transmit power count subfield in Table 2) is set to "3", N is 4, and the transmit power envelope element of the first message frame may include four second identifications, defining four 20 MHz PSD formats for the 80 MHz bandwidth, respectively. If the third identification (the maximum transmit power count subfield in Table 2) is set to "4", N is 8, and the transmit power envelope element of the first message frame may include eight second identifications, defining eight 20 MHz PSD formats for the 160/80+80 MHz bandwidth, respectively.

It will be understood that the values shown in FIG. 5 are only descriptive examples and are not a limitation of the present disclosure, and that the third identification (the maximum transmit power count subfield in Table 2) may also be set to other values to identify the maximum transmit power PSD over the basic channel bandwidths within other bandwidths (e.g., a bandwidth of 240 MHz/160+80 MHz or other bandwidths that is to be used for the communication) according to embodiments of the present disclosure.

According to embodiments of the present disclosure, it is possible to define maximum transmit power at a bandwidth of up to 320 MHz/160+160 MHz, which meets current communication needs and improves spectrum utilization.

FIG. 6 is a flowchart illustrating another communication method according to embodiments of the present disclosure.

The communication method shown in FIG. 6 may include operations performed at a station side, and includes steps 610 and 620.

Referring to FIG. 6, at step 610, a first message frame is received. According to embodiments, the first message frame may include a transmit power envelope element, where the transmit power envelope element may include information indicative of maximum transmit power for a bandwidth of 320 MHz/160+160 MHz.

According to embodiments, the transmit power envelope element may further include information indicative of maximum transmit power for at least one of: a 20 MHz bandwidth, a 40 MHz bandwidth, an 80 MHz bandwidth, or a 160 MHz/80+80 MHz bandwidth.

According to embodiments, the transmit power envelope element includes a first identification for indicating a manner of identifying the maximum transmit power.

According to embodiments, the transmit power envelope element may further include at least one second identification for indicating maximum transmit power with respect to one or more bandwidths.

According to embodiments, the transmit power envelope element may further include a third identification, where the third identification is related to a number of the at least one second identification.

According to embodiments, the at least one second identification indicates maximum transmit power for each bandwidth, respectively, in response to determining that the first identification is configured to identify the maximum transmit power in a first manner. According to embodiments, the first manner is an EIRP manner. In this case, the at least one second identification indicates maximum transmit power for each of the 20 MHz, 40 MHz, 80 MHz, 160 MHz/80+80 MHz, and 320 MHz/160+160 MHz bandwidths, respectively, in response to determining that the third identification is configured to a first value.

According to embodiments, the at least one second identification indicates maximum transmit power over one or more basic channel bandwidths within each bandwidth, in response to determining that the first identification is configured to identify the maximum transmit power in a second manner. The second manner is an EIRP PSD manner. In this case, in response to determining that the third identification is configured to a second value to indicate presence of M basic channel bandwidths within the 320 MHz/160+160 MHz bandwidth, the number of the at least one second identification is N, and the N second identifications indicate maximum transmit power over the M basic channel bandwidths for the 320 MHz/160+160 MHz bandwidth, respectively. N is determined based on the 320 MHz/160+160 MHz bandwidth and the basic channel bandwidth.

The examples of the transmit power envelope elements, the first identification, the second identification(s), and the third identification described above with reference to Tables 1 to 5 and FIGS. 3 to 5 may also be applied to step 610, and repetitive descriptions are omitted herein to avoid redundancy.

With continued reference to FIG. 6, at step 620, a communication operation may be performed based on the first message frame. For example, when the station receives the first message frame from the access point, the station may be informed of the maximum transmit power at various bandwidths based on the transmit power envelope element carried in the first message frame. Thus, the station can control the transmit power suitably in subsequent data transmissions, thereby reducing interference between devices and saving power.

FIG. 7 is a block diagram illustrating a communication apparatus according to embodiments. The communication apparatus 700 described in FIG. 7 may be applied to an AP or may be applied to an STA. Referring to FIG. 7, the communication apparatus 700 includes a processing module 710 and a transceiver module 720.

In the case where the communication apparatus 700 of FIG. 7 is applied to the AP, the communication apparatus 700 may perform a communication method described with reference to FIG. 2. For example, the processing module 710 may be configured to: determine a first message frame, where the first message frame includes a transmit power envelope element, and the transmit power envelope element includes information indicative of maximum transmit power for a bandwidth of 320 MHz/160+160 MHz. The processing module 710 may be any type of processor, including but not limited to any combination of a central processing unit (CPU), control unit (CU), graphics processing unit (GPU), micro-processors, etc. The transceiver module 720 is configured to: transmit the first message frame. In this case, the examples of the transmit power envelope element, the first identification, the second identification and the third identification described with reference to FIG. 2, Tables 1 to 5, and FIGS. 3 to 5 may also be applied here, and repetitive descriptions are omitted herein to avoid redundancy. The transceiver module 700 may be any type of known transceiver including, but not limited to any combination of an input/output device, a transmitter, a transceiver, etc., and may communicate via wires or any wireless technology.

In the case where the communication apparatus 700 of FIG. 7 is applied to the STA, the communication apparatus 700 may perform a communication method described with reference to FIG. 6. For example, the transceiver module 720 may be configured to: receive a first message frame, where the first message frame includes a transmit power envelope element, and the transmit power envelope element includes information indicative of maximum transmit power for a bandwidth of 320 MHz/160+160 MHz. The processing module 710 may be configured to: perform a communication operation based on the first message frame. In this case, the examples of the transmit power envelope element, the first identification, the second identification, and the third identification are described with reference to FIG. 6, Tables 1 to 5, and FIGS. 3 to 5 may also be applied here, and repetitive descriptions are omitted herein to avoid redundancy.

Furthermore, the communication apparatus 700 shown in FIG. 7 is only exemplary, and embodiments of the present disclosure are not limited thereto. For example, the communication apparatus 700 may also include other modules, e.g., a memory module, etc. In addition, individual modules in the communication apparatus 700 may be combined into more complex modules or may be divided into more individual modules to support various functions.

Based on the same principles as the methods provided in embodiments of the present disclosure, embodiments of the present disclosure also provide an electronic device, including the communication apparatus 700, including a processor, an input/output device, and a memory, where the memory stores machine-readable instructions (which may also be referred to as a "computer program"), and the processor executes the machine-readable instructions to implement the methods described with reference to FIG. 2 or FIG. 6, and the input/output device sends and/or receives the machine-readable instructions and/or the solutions obtained by implementing the methods described with reference to FIG. 2 or FIG. 6.

Embodiments of the present disclosure also provide a computer-readable storage medium on which a computer program is stored, the computer program being executed by the processor to implement the methods described with reference to FIG. 2 or FIG. 6.

In example embodiments, the processor may be used to implement or execute the various illustrative logical blocks, modules, and circuits described in connection with the present disclosure, such as a CPU (Central Processing Unit), a general processor, a DSP (Digital Signal Processor), an ASIC (Application Specific Integrated Circuit), a field programmable gate array (FPGA) or other programmable logic devices, a transistor logic device, a hardware component, or any combination thereof. The processor may also be a combination for implementing a calculation function, for example, a combination including one or more microprocessors, a combination of a DSP and a microprocessor, and the like.

In example embodiments, the memory may be, for example, a ROM (Read Only Memory), a RAM (Random Access Memory), an EEPROM (Electrically Erasable Programmable Read Only Memory), a CD-ROM (Compact Disc Read Only Memory) or other optical disk storage, optical disk storage (including compact disc, laser disc, optical disc, digital versatile disc, Blu-ray disc, etc.), magnetic storage media or other magnetic storage devices, or any other medium that can be used to carry or store program codes in the form of instructions or data structures and that can be accessed by a computer, which are not limited thereto.

It should be understood that although the steps in the flowchart of the accompanying drawings are shown sequentially as indicated by arrows, the steps are not necessarily performed sequentially in the order indicated by the arrows. Unless expressly stated herein, the execution of these steps is not strictly limited in order, and they may be executed in other orders. In addition, at least some of the steps in the flowchart of the accompanying drawings may include a plurality of sub-steps or a plurality of phases. These sub-steps or phases are not necessarily executed at the same time, but may be executed at different times. The execution order of the sub-steps or phases is not necessarily executed in sequence, and may be executed in turn or alternately with at least a portion of other steps or sub-steps or phases of other steps.

Although the present disclosure has been shown and described with reference to certain embodiments of the present disclosure, those skilled in the art will appreciate that various changes in form and detail can be made without departing from the scope of the present disclosure. Accordingly, the scope of the present disclosure should not be limited to the embodiments, but should be defined by the appended claims and their equivalents.

The invention claimed is:

1. A communication method, comprising:
   determining a first message frame, wherein the first message frame comprises a transmit power envelope element, and the transmit power envelope element comprises information indicative of maximum transmit power for a 320 MHz bandwidth, wherein the transmit power envelope element comprises a first identification and at least one second identification, and the first identification is for indicating a manner of identifying the maximum transmit power, wherein in response to the first identification being configured to identify the maximum transmit power in a first manner, the at least one second identification indicates the maximum transmit power for the 320 MHz bandwidth, and in response to the first identification being configured to identify the maximum transmit power in a second manner, the at least one second identification indicates maximum transmit power corresponding to one or more basic channel bandwidths within the 320 MHz bandwidth; and transmitting the first message frame.

2. The communication method according to claim 1, wherein the transmit power envelope element further comprises information indicative of a maximum transmit power for at least one of: a 20 MHz bandwidth, a 40 MHz bandwidth, an 80 MHz bandwidth, or a 160 MHz/80+80 MHz bandwidth.

3. The communication method according to claim 1, wherein the at least one second identification is for indicating the maximum transmit power with respect to one or more bandwidths.

4. The communication method according to claim 3, wherein the transmit power envelope element further comprises a third identification, wherein the third identification is related to a number of the at least one second identification.

5. The communication method according to claim 4, wherein the at least one second identification indicates a maximum transmit power for each of the one or more bandwidths of 20 MHz, 40 MHz, 80 MHz, 160 MHz/80+80 MHz, and the 320 MHz bandwidth, respectively, and the third identification is configured to a first value.

6. The communication method according to claim 4, wherein the third identification is configured to a second value to indicate existence of N basic channel bandwidths within the 320 MHz bandwidth, the number of the at least one second identification is N, and the at least one second identifications N indicates a maximum transmit power corresponding to the N basic channel bandwidths for the 320 MHz bandwidth, respectively, and wherein N is determined based on the 320 MHz bandwidth and the basic channel bandwidths.

7. A communication system, comprising: an access point and a station, wherein the access point comprises a memory, a processor and a computer program stored on the memory and executable by the processor, wherein the processor executes the computer program to implement the method of claim 1, wherein the station comprises a memory, a processor and a computer program stored on the memory and executable by the processor, wherein the processor executes the computer program to: receiving a first message frame; and perform a communication operation based on the first message frame.

8. The communication method according to claim 1, wherein the first manner is an effective isotropic radiated power (EIRP) manner.

9. The communication method according to claim 1, wherein the second manner is an effective isotropic radiated power (EIRP) power spectral density (PSD) manner.

10. A communication method, comprising:

determining, by an access point, a first message frame, wherein the first message frame comprises a transmit power envelope element, and the transmit power envelope element comprises information indicative of maximum transmit power for a 320 MHz bandwidth, wherein the transmit power envelope element comprises a first identification and at least one second identification, and the first identification is for indicating a manner of identifying the maximum transmit power, wherein in response to the first identification being configured to identify the maximum transmit power in a first manner, the at least one second identification indicates the maximum transmit power for the 320 MHz bandwidth, and in response to the first identification being configured to identify the maximum transmit power in a second manner, the at least one second identification indicates maximum transmit power corresponding to one or more basic channel bandwidths within the 320 MHz bandwidth;

transmitting, by the access point, the first message frame;

receiving, by a station, the first message frame; and performing a communication operation based on the first message frame.

11. The communication method according to claim 10, wherein the transmit power envelope element further comprises information indicative of a maximum transmit power for at least one of: a 20 MHz bandwidth, a 40 MHz bandwidth, an 80 MHz bandwidth, or a 160 MHz/80+80 MHz bandwidth.

12. The communication method according to claim 10, wherein the at least one second identification for indicating a maximum transmit power with respect to one or more bandwidths.

13. The communication method according to claim 12, wherein the transmit power envelope element further comprises a third identification, wherein the third identification is related to a number of the at least one second identification.

14. The communication method according to claim 13, wherein the at least one second identification indicates the maximum transmit power for each of the one or more bandwidths of 20 MHz, 40 MHz, 80 MHz, 160 MHz/80+80 MHz, and the 320 MHz bandwidth, respectively, and the third identification is configured to a first value.

15. The communication method according to claim 13, wherein the third identification is configured to a second value to indicate existence of N basic channel bandwidths within the 320 MHz bandwidth, the number of the at least one second identification is N, and the at least one second identifications N indicates maximum transmit power corresponding to the N basic channel bandwidths for the 320 MHz bandwidth, respectively, and wherein N is determined based on the 320 MHz bandwidth and the basic channel bandwidths.

16. An electrical device, comprising a memory, a processor and a computer program stored on the memory and executable by the processor, wherein the processor executes the computer program to:

determine a first message frame, wherein the first message frame comprises a transmit power envelope element, and the transmit power envelope element comprises information indicative of maximum transmit power for a 320 MHz/160+160 MHz bandwidth, wherein the transmit power envelope element comprises a first identification and at least one second identification, and the first identification is for indicating a manner of identifying the maximum transmit power, wherein in response to the first identification being configured to identify the maximum transmit power in a first manner, the at least one second identification indicates the maximum transmit power for the 320 MHz bandwidth, and in response to the first identification being configured to identify the maximum transmit power in a second manner, the at least one second identification indicates maximum transmit power corresponding to one or more basic channel bandwidths within the 320 MHz bandwidth; and transmit the first message frame.

* * * * *